United States Patent
Han et al.

(10) Patent No.: US 11,432,165 B2
(45) Date of Patent: Aug. 30, 2022

(54) METHOD AND APPARATUS FOR ADJUSTING BROADCAST BEAM DOMAIN

(71) Applicant: HUAWEI TECHNOLOGIES CO., LTD., Guangdong (CN)

(72) Inventors: Ran Han, Wuhan (CN); Ji Xia, Dongguan (CN); Hongyan Yu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 70 days.

(21) Appl. No.: 16/853,879

(22) Filed: Apr. 21, 2020

(65) Prior Publication Data

US 2020/0252807 A1    Aug. 6, 2020

Related U.S. Application Data

(63) Continuation of application No. PCT/CN2017/108117, filed on Oct. 27, 2017.

(51) Int. Cl.
    *H04W 16/28* (2009.01)
    *H04W 24/02* (2009.01)
    (Continued)

(52) U.S. Cl.
    CPC ........... *H04W 16/28* (2013.01); *H04W 24/02* (2013.01); *H04W 24/08* (2013.01)

(58) Field of Classification Search
    None
    See application file for complete search history.

(56) References Cited

U.S. PATENT DOCUMENTS 10,116,373 B1 *  10/2018  Marupaduga ........... H04L 43/16
2014/0266900 A1 *  9/2014  Kasher .................. H04W 16/28
                                                              342/372

(Continued)

FOREIGN PATENT DOCUMENTS

CN     104617994 A     5/2015
CN     105227224 A     1/2016
         (Continued)

OTHER PUBLICATIONS

Machine translation of CN105322994A, filed Feb. 10, 2016 (Year: 2016).*

*Primary Examiner* — Faruk Hamza
*Assistant Examiner* — Cassandra L Decker
(74) *Attorney, Agent, or Firm* — Womble Bond Dickinson (US) LLP

(57) ABSTRACT

A method includes: obtaining user equipment distribution information of a beam domain, where there are at least two beam domains, and the beam domain is a vertical area in a physically vertical dimension of a cell coverage area; determining information about a concentrated beam domain based on the user equipment distribution information, where the concentrated beam domain is a beam domain in which a quantity of covered user equipments exceeds a quantity threshold; and compared with information about a historical concentrated beam domain, if the information about the concentrated beam domain satisfies a preset condition, adjusting a broadcast beam domain based on the information about the concentrated beam domain, so that a main lobe direction of the broadcast beam domain is adjusted to a beam domain corresponding to the concentrated beam domain.

15 Claims, 4 Drawing Sheets

(51) Int. Cl.
*H04W 24/08* (2009.01)
*H04B 7/06* (2006.01)

(56) References Cited

U.S. PATENT DOCUMENTS

| | | | | |
|---|---|---|---|---|
| 2016/0065282 | A1* | 3/2016 | Zhang | H04B 7/0452 |
| | | | | 370/281 |
| 2016/0249230 | A1* | 8/2016 | Akbar | H04H 20/67 |
| 2018/0041908 | A1* | 2/2018 | Faxer | H04W 24/02 |
| 2018/0062722 | A1* | 3/2018 | Su | H04B 7/0626 |
| 2018/0242158 | A1* | 8/2018 | Tang | H04W 72/0473 |
| 2019/0296813 | A1* | 9/2019 | Wang | H04B 7/0897 |

FOREIGN PATENT DOCUMENTS

| | | | |
|---|---|---|---|
| CN | 105322994 A | * | 2/2016 |
| CN | 105322994 A | | 2/2016 |
| CN | 105375959 A | | 3/2016 |
| CN | 106033987 A | | 10/2016 |
| CN | 106488472 A | | 3/2017 |
| CN | 107104285 A | | 8/2017 |
| WO | 2014204266 A1 | | 12/2014 |
| WO | 2015110166 A1 | | 7/2015 |
| WO | 2015152931 A1 | | 10/2015 |
| WO | 2016210302 A1 | | 12/2016 |

\* cited by examiner

METHOD AND APPARATUS FOR ADJUSTING BROADCAST BEAM DOMAIN

CROSS-REFERENCE TO RELATED APPLICATIONS

This application is a continuation of International Patent Application No. PCT/CN2017/108117, filed on Oct. 27, 2017, the disclosure of which is hereby incorporated by reference in its entirety.

TECHNICAL FIELD

The present disclosure relates to the communications field, and in particular, to a method and apparatus for adjusting a broadcast beam domain.

BACKGROUND

In a massive multiple-input multiple-output (Massive MIMO) technology, a wider and deeper 3D (three Dimensional) wireless coverage capability is obtained by currently using a massive multiple-antenna technology. To improve wireless spectrum utilization, in the massive MIMO technology, the wireless spectrum utilization of a system is improved greatly by using spatial multiplexing and a pairing policy.

A configuration of a broadcast beam domain in a conventional massive MIMO cell is static. To be specific, a cell broadcast beam weighted value is fixed. A base station of the massive MIMO cell directs a main lobe direction of a broadcast beam to a core area of the cell based on the configuration of the broadcast beam domain.

In the foregoing manner of the static configuration of the broadcast beam domain, for a scenario in which user equipments are evenly distributed in the main lobe direction of the broadcast beam domain, a spectrum efficiency gain ratio is obvious. However, for a scenario in which user equipments are distributed densely and a collective location changes greatly, because the broadcast beam domain is statically configured once, the broadcast beam domain is aligned to one area. If a large quantity of user equipments collectively moves out of the area in the main lobe direction of the broadcast beam domain, user signal quality of the user equipments may be degraded.

SUMMARY

The present disclosure provides a method and apparatus for adjusting a broadcast beam domain, used to adjust the broadcast beam domain based on user equipment distribution information of a beam domain, and is applicable to a scenario in which user equipments are distributed densely and a collective location changes greatly, to improve user channel quality.

A first aspect of the present disclosure provides a method for adjusting a broadcast beam domain, including:

obtaining user equipment distribution information of a beam domain, where there are at least two beam domains, and the beam domain is a vertical area in a physically vertical dimension of a cell coverage area, and the user equipment distribution information is a distribution situation of user equipments in a coverage area of each beam domain;

determining information about a concentrated beam domain based on the user equipment distribution information, where the concentrated beam domain is a beam domain in which a quantity of covered user equipments exceeds a quantity threshold; and compared with information about a historical concentrated beam domain, if the information about the concentrated beam domain satisfies a preset condition, adjusting a broadcast beam domain based on the information about the concentrated beam domain, so that a main lobe direction of the broadcast beam domain is adjusted to a beam domain corresponding to the concentrated beam domain.

In a scenario in which user equipments are distributed densely and a collective location changes greatly, at least two vertical areas are obtained through division in a physically vertical dimension of a cell coverage area of a massive MIMO cell, and each vertical area corresponds to one beam domain. The user equipment distribution information of the beam domain may be obtained in a manner of periodically monitoring user equipment distribution information of a beam domain in the massive MIMO cell, channel sounding, or the like. The user equipment herein is a terminal that may establish a communications connection to an access network device, for example, a smartphone. Then, the information about the concentrated beam domain is determined based on the user equipment distribution information, where the concentrated beam domain is the beam domain in which the quantity of user equipments covered in all beam domains exceeds the quantity threshold, and a size of the quantity threshold is preset. Compared with the information about the historical concentrated beam domain, if the information about the concentrated beam domain satisfies the preset condition, it indicates that the broadcast beam domain needs to be adjusted. The broadcast beam domain is adjusted based on the information about the concentrated beam domain, and the main lobe direction of the broadcast beam domain is adjusted to the beam domain corresponding to the concentrated beam domain, thereby dynamically adjusting the broadcast beam domain by using the user equipment distribution information. Compared with statically configuring the broadcast beam domain in a conventional manner, flexibly and dynamically adjusting the broadcast beam domain is applicable to the scenario in which the user equipments are distributed densely and the collective location changes greatly, so that user channel quality may be improved effectively, thereby improving a cell pairing rate, and further improving cell spectrum efficiency and a user-perceived rate.

With reference to the first aspect of the present disclosure, in a first implementation of the first aspect of the present disclosure, before the obtaining user equipment distribution information of a beam domain, the method further includes:

obtaining direction angle information of the vertical area, where there are at least two vertical areas, and the vertical area is obtained through division in the physically vertical dimension of the cell coverage area;

setting a cell uplink beam matrix based on the direction angle information; and determining the at least two beam domains based on the cell uplink beam matrix, where one beam domain corresponds to one vertical area.

Because currently, a manner for sounding a location of the user equipment is usually obtaining distance information of the user equipment by receiving channel sounding information of the user equipment, a location of the user equipment in a horizontal dimension can be learned only through the distance information, but a location of the user equipment in the vertical dimension cannot be learned, a specific area in which the user equipment is located cannot be determined.

Therefore, the at least two vertical areas need to be obtained through division in the physically vertical dimension of the cell coverage area, direction angle information of each vertical area is obtained, and the cell uplink beam matrix is set based on the direction angle information. Because a quantity of beam domains and a corresponding vertical area are determined by the cell uplink beam matrix, the at least two beam domains may be determined based on the cell uplink beam matrix, where one beam domain corresponds to one vertical area.

With reference to the first implementation of the first aspect of the present disclosure, in a second implementation of the first aspect of the present disclosure, the obtaining user equipment distribution information of a beam domain includes:

obtaining channel sounding information of a user equipment, where there is at least one user equipment;

performing weighted processing on the channel sounding information and the cell uplink beam matrix, to obtain a weighted result; and determining, based on the weighted result, a beam domain in which the user equipment is located, to obtain the user equipment distribution information of the beam domain.

Because the beam domain of the cell coverage area of the massive MIMO cell is determined by the cell uplink beam matrix, after the weighted processing is performed on the channel sounding information of the user equipment and the cell uplink beam matrix, the obtained weighted result can be used as a standard for determining the beam domain in which the user equipment is located. The user equipment in the cell coverage area periodically sends the channel sounding information, obtains channel sounding information sent by the at least one user equipment in the cell coverage area, and separately performs weighted processing on the channel sounding information of each user equipment and the cell uplink beam matrix, to obtain a weighted result corresponding to each user equipment. Because the beam domain in which the user equipment is located can be determined based on the weighted result, the quantity of user equipments covered by each beam domain can be determined. Therefore, the user equipment distribution information of the beam domain can be obtained.

With reference to the first aspect of the present disclosure, in a third implementation of the first aspect of the present disclosure, the determining information about a concentrated beam domain based on the user equipment distribution information includes:

obtaining, based on the user equipment distribution information, the quantity of user equipments covered by each beam domain; and if the quantity of user equipments exceeds the quantity threshold, determining a beam domain corresponding to the quantity of user equipments as the concentrated beam domain, and recording the information about the concentrated beam domain, where there is at least one concentrated beam domain.

After the user equipment distribution information is determined, the information about the concentrated beam domain further needs to be determined based on the user equipment distribution information. Because a user channel quality problem of the massive MIMO cell needs to be resolved, a most important solution is to first satisfy user channel quality of the beam domain in which the quantity of user equipments exceeds the quantity threshold. The quantity of user equipments covered by each beam domain may be obtained based on the user equipment distribution information of the beam domain. A total quantity of user equipments can be obtained based on a sum of quantities of user equipments covered by all the beam domains. A ratio of the quantity of user equipments covered by each beam domain to the total quantity of user equipments is a ratio of the user equipments of each beam domain. A preset threshold is preset for the ratio of the user equipments, and the quantity threshold is the preset threshold multiplied by the total quantity of user equipments. If the quantity of user equipments covered by one beam domain exceeds the quantity threshold, the beam domain is used as the concentrated beam domain, where there may be one or more concentrated beam domains, and the information about the concentrated beam domain is recorded.

With reference to the third implementation of the first aspect of the present disclosure, in a fourth implementation of the first aspect of the present disclosure, before the adjusting a broadcast beam domain based on the information about the concentrated beam domain, the method further includes:

obtaining the information about the historical concentrated beam domain, where the historical concentrated beam domain is a beam domain corresponding to the broadcast beam domain used when a broadcast beam is transmitted last time;

if the historical concentrated beam domain and the concentrated beam domain reach preset area isolation, determining that compared with the information about the historical concentrated beam domain, the information about the concentrated beam domain satisfies the preset condition.

Assuming that the concentrated beam domain is a beam domain 1, a main lobe direction of a broadcast beam in this case should be directed to the beam domain 1, so that user channel quality of user equipment in the beam domain 1 is optimal. However, the beam domain corresponding to the broadcast beam domain used when the broadcast beam is transmitted last time is a beam domain 3. Whether the historical concentrated beam domain and the concentrated beam domain reach the preset area isolation is determined, where the preset area isolation is preset. When the user equipment is located in different beam domains, a degraded degree of the user channel quality is considered. For example, when the main lobe direction of the broadcast beam domain is the beam domain 1, user channel quality of user equipment in an adjacent beam domain (a beam domain 2) is in an allowed range while a degraded degree of user channel quality of user equipment in the beam domain 3 exceeds the allowed range, the preset area isolation is the adjacent beam domain. When the historical concentrated beam domain is the beam domain 3, and the concentrated beam domain is the beam domain 1, the beam domain 1 and the beam domain 3 are not adjacent beam domains. The historical concentrated beam domain and the concentrated beam domain reach the preset area isolation, indicating that if a currently to-be-transmitted broadcast beam is transmitted based on the broadcast beam domain last time, the user channel quality of the user equipment in the beam domain 1 cannot be ensured, and compared with the information about the historical concentrated beam domain, the information about the concentrated beam domain satisfies the preset condition. If the historical concentrated beam domain is the beam domain 1, and the concentrated beam domain is also the beam domain 1, it indicates that if the currently to-be-transmitted broadcast beam is transmitted based on the broadcast beam domain last time, the user channel quality of the user equipment in the beam domain 1 is in the allowed range, and compared with the information about the historical concentrated beam domain, the information about the concentrated beam domain does not satisfy the preset condition.

With reference to the fourth implementation of the first aspect of the present disclosure, in a fifth implementation of the first aspect of the present disclosure, the adjusting a broadcast beam domain based on the information about the concentrated beam domain includes:

determining a broadcast beam weighted value of the concentrated beam domain based on the information about the concentrated beam domain;

determining a historical broadcast beam weighted value of the historical concentrated beam domain based on the information about the historical concentrated beam domain; and adjusting the historical broadcast beam weighted value as the broadcast beam weighted value, so that the main lobe direction of the broadcast beam domain is adjusted to the concentrated beam domain.

Compared with the information about the historical concentrated beam domain, if the information about the concentrated beam domain satisfies the preset condition, it indicates that the broadcast beam domain needs to be adjusted. The broadcast beam weighted value of the concentrated beam domain is determined based on the information about the concentrated beam domain, and before the adjustment, the broadcast beam may be transmitted by using each beam domain as the main lobe direction of the broadcast beam domain in advance, thereby recording a preset broadcast beam weighted value when each beam domain is used as the main lobe direction of the broadcast beam domain. After the concentrated beam domain is determined, a preset broadcast beam weighted value corresponding to the concentrated beam domain may be selected as the broadcast beam weighted value from a database, and the historical broadcast beam weighted value of the historical concentrated beam domain is replaced with the broadcast beam weighted value corresponding to the concentrated beam domain. The main lobe direction of the broadcast beam domain may be directed to the concentrated beam domain, and a main lobe of the broadcast beam transmitted by using the broadcast beam weighted value covers the concentrated beam domain, thereby flexibly adjusting the broadcast beam domain.

A second aspect of the present disclosure provides an apparatus for adjusting a broadcast beam domain, including:

a receiving module, configured to obtain user equipment distribution information of a beam domain, where there are at least two beam domains, and the beam domain is a vertical area in a physically vertical dimension of a cell coverage area, and the user equipment distribution information is a distribution situation of user equipments in a coverage area of each beam domain;

a processing module, configured to determine information about a concentrated beam domain based on the user equipment distribution information, where the concentrated beam domain is a beam domain in which a quantity of covered user equipments exceeds a quantity threshold, and the processing module is further configured to: compared with information about a historical concentrated beam domain, when the information about the concentrated beam domain satisfies a preset condition, adjust a broadcast beam domain based on the information about the concentrated beam domain, so that a main lobe direction of the broadcast beam domain is adjusted to a beam domain corresponding to the concentrated beam domain.

In a scenario in which user equipments are distributed densely and a collective location changes greatly, at least two vertical areas are obtained through division in a physically vertical dimension of a cell coverage area of a massive MIMO cell, and each vertical area corresponds to one beam domain. The receiving module may obtain the user equipment distribution information of the beam domain in a manner of periodically monitoring user equipment distribution information of a beam domain in the massive MIMO cell, channel sounding, or the like. The user equipment herein is actually a terminal that may establish a communications connection to an access network device, for example, a smartphone. Then, the processing module determines the information about the concentrated beam domain based on the user equipment distribution information, where the concentrated beam domain is the beam domain in which the quantity of user equipments covered in all beam domains exceeds the quantity threshold, and a size of the quantity threshold is preset. Compared with the information about the historical concentrated beam domain, if the information about the concentrated beam domain satisfies the preset condition, it indicates that the broadcast beam domain needs to be adjusted. The broadcast beam domain is adjusted based on the information about the concentrated beam domain, and the main lobe direction of the broadcast beam domain is adjusted to the beam domain corresponding to the concentrated beam domain, thereby dynamically adjusting the broadcast beam domain by using the user equipment distribution information. Compared with statically configuring the broadcast beam domain in a conventional manner, flexibly and dynamically adjusting the broadcast beam domain is applicable to the scenario in which the user equipments are distributed densely and the collective location changes greatly, so that user channel quality may be improved effectively, thereby improving a cell pairing rate, and further improving cell spectrum efficiency and a user-perceived rate.

With reference to the second aspect of the present disclosure, in a first implementation of the second aspect of the present disclosure, the receiving module is further configured to obtain direction angle information of the vertical area, where there are at least two vertical areas, and the vertical area is obtained through division in the physically vertical dimension of the cell coverage area;

the processing module is further configured to set a cell uplink beam matrix based on the direction angle information; and the processing module is further configured to determine the at least two beam domains based on the cell uplink beam matrix, where one beam domain corresponds to one vertical area.

Because currently, a manner for sounding a location of the user equipment is usually obtaining distance information of the user equipment by receiving channel sounding information of the user equipment, a location of the user equipment in a horizontal dimension can be learned only through the distance information, but a location of the user equipment in the vertical dimension cannot be learned, a specific area in which the user equipment is located cannot be determined. Therefore, the at least two vertical areas need to be obtained through division in the physically vertical dimension of the cell coverage area, the receiving module obtains direction angle information of each vertical area, and the processing module sets a cell uplink beam matrix based on the direction angle information. Because a quantity of beam domains and a corresponding vertical area are determined by the cell uplink beam matrix, the at least two beam domains may be determined based on the cell uplink beam matrix, where one beam domain corresponds to one vertical area.

With reference to the first implementation of the second aspect of the present disclosure, in a second implementation of the second aspect of the present disclosure, the receiving module is further configured to obtain channel sounding information of a user equipment, where there is at least one user equipment;

the processing module is further configured to perform weighted processing on the channel sounding information and the cell uplink beam matrix, to obtain a weighted result; and the processing module is further configured to determine, based on the weighted result, a beam domain in which the user equipment is located, to obtain the user equipment distribution information of the beam domain.

Because the beam domain of the cell coverage area of the massive MIMO cell is determined by the cell uplink beam matrix, after the weighted processing is performed on the channel sounding information of the user equipment and the cell uplink beam matrix, the obtained weighted result can be used as a standard for determining the beam domain in which the user equipment is located. The user equipment in the cell coverage area periodically sends the channel sounding information. The receiving module obtains channel sounding information sent by the at least one user equipment in the cell coverage area, and the processing module separately performs weighted processing on the channel sounding information of each user equipment and the cell uplink beam matrix, to obtain a weighted result corresponding to each user equipment. Because the beam domain in which the user equipment is located can be determined based on the weighted result, the quantity of user equipments covered by each beam domain can be determined. Therefore, the user equipment distribution information of the beam domain can be obtained.

With reference to the second aspect of the present disclosure, in a third implementation of the second aspect of the present disclosure, the processing module is further configured to obtain, based on the user equipment distribution information, the quantity of user equipments covered by each beam domain; and the processing module is further configured to: when the quantity of user equipments exceeds the quantity threshold, determine a beam domain corresponding to the quantity of user equipments as the concentrated beam domain, and record the information about the concentrated beam domain, where there is at least one concentrated beam domain.

After determining the user equipment distribution information, the processing module further needs to determine, based on the user equipment distribution information, the information about the concentrated beam domain. Because a user channel quality problem of the massive MIMO cell needs to be resolved, a most important solution is to first satisfy user channel quality of the beam domain in which the quantity of user equipments exceeds the quantity threshold. The processing module may obtain, based on the user equipment distribution information of the beam domain, the quantity of user equipments covered by each beam domain. A total quantity of user equipments can be obtained based on a sum of quantities of user equipments covered by all the beam domains. A ratio of the quantity of user equipments covered by each beam domain to the total quantity of user equipments is a ratio of the user equipments of each beam domain. A preset threshold is preset for a ratio of a quantity of users, and the quantity threshold is the preset threshold multiplied by the total quantity of user equipments. If the quantity of user equipments covered by one beam domain exceeds the quantity threshold, the processing module uses the beam domain as the concentrated beam domain, where there may be one or more concentrated beam domains, and record the information about the concentrated beam domain.

With reference to the third implementation of the second aspect of the present disclosure, in a fourth implementation of the second aspect of the present disclosure, the receiving module is further configured to obtain the information about the historical concentrated beam domain, where the historical concentrated beam domain is a beam domain corresponding to the broadcast beam domain used when a broadcast beam is transmitted last time; and the processing module is further configured to: when the historical concentrated beam domain and the concentrated beam domain reach preset area isolation, determine that compared with the information about the historical concentrated beam domain, the information about the concentrated beam domain satisfies the preset condition.

Assuming that the concentrated beam domain is a beam domain 1, a main lobe direction of a broadcast beam in this case should be directed to the beam domain 1, so that user channel quality of user equipment in the beam domain 1 is optimal. However, the beam domain that corresponds to the broadcast beam domain used when the broadcast beam is transmitted last time and that is obtained by the receiving module is a beam domain 3. The processing module determines whether the historical concentrated beam domain and the concentrated beam domain reach the preset area isolation, where the preset area isolation is preset. When the user equipment is located in different beam domains, a degraded degree of the user channel quality is considered. For example, when the main lobe direction of the broadcast beam domain is the beam domain 1, user channel quality of user equipment in an adjacent beam domain (a beam domain 2) is in an allowed range while a degraded degree of user channel quality of user equipment in the beam domain 3 exceeds the allowed range, the preset area isolation is the adjacent beam domain. When the historical concentrated beam domain is the beam domain 3, and the concentrated beam domain is the beam domain 1, the beam domain 1 and the beam domain 3 are not adjacent beam domains. The historical concentrated beam domain and the concentrated beam domain reach the preset area isolation, indicating that if a currently to-be-transmitted broadcast beam is transmitted based on the broadcast beam domain last time, the user channel quality of the user equipment in the beam domain 3 cannot be ensured, and compared with the information about the historical concentrated beam domain, the information about the concentrated beam domain satisfies the preset condition. If the historical concentrated beam domain is the beam domain 1, and the concentrated beam domain is also the beam domain 1, it indicates that if the currently to-be-transmitted broadcast beam is transmitted based on the broadcast beam domain last time, the user channel quality of the user equipment in the beam domain 1 is in the allowed range, and compared with the information about the historical concentrated beam domain, the information about the concentrated beam domain does not satisfy the preset condition.

With reference to the fourth implementation of the second aspect of the present disclosure, in a fifth implementation of the second aspect of the present disclosure, the processing module is further configured to determine a broadcast beam weighted value of the concentrated beam domain based on the information about the concentrated beam domain;

the processing module is further configured to determine a historical broadcast beam weighted value of the historical concentrated beam domain based on the information about the historical concentrated beam domain; and the processing module is further configured to adjust the historical broadcast beam weighted value as the broadcast beam weighted value, so that the main lobe direction of the broadcast beam domain is adjusted to the concentrated beam domain.

Compared with the information about the historical concentrated beam domain, when the information about the concentrated beam domain satisfies the preset condition, it indicates that the broadcast beam domain needs to be adjusted. The processing module determines, based on the information about the concentrated beam domain, the broadcast beam weighted value of the concentrated beam domain, and before the adjustment, the broadcast beam may be transmitted by using each beam domain as the main lobe direction of the broadcast beam domain in advance, thereby recording a preset broadcast beam weighted value when each beam domain is used as the main lobe direction of the broadcast beam domain. After determining the concentrated beam domain, the processing module may select a preset broadcast beam weighted value corresponding to the concentrated beam domain as the broadcast beam weighted value from a database, and replace the historical broadcast beam weighted value of the historical concentrated beam domain with the broadcast beam weighted value corresponding to the concentrated beam domain. The main lobe direction of the broadcast beam domain may be directed to the concentrated beam domain, and a main lobe of the broadcast beam transmitted by using the broadcast beam weighted value covers the concentrated beam domain, thereby flexibly adjusting the broadcast beam domain.

A third aspect of the present disclosure provides an access network device, including:

a processor, a transceiver, and a memory, where the memory is configured to store code executed by the processor;

the transceiver is configured to obtain user equipment distribution information of a beam domain, where there are at least two beam domains, and the beam domain is a vertical area in a physically vertical dimension of a cell coverage area, and the user equipment distribution information is a distribution situation of user equipments in a coverage area of each beam domain;

the processor is configured to determine information about a concentrated beam domain based on the user equipment distribution information, where the concentrated beam domain is a beam domain in which a quantity of covered user equipments exceeds a quantity threshold; and the processor is further configured to: compared with information about a historical concentrated beam domain, when the information about the concentrated beam domain satisfies a preset condition, adjust a broadcast beam domain based on the information about the concentrated beam domain, so that a main lobe direction of the broadcast beam domain is adjusted to a beam domain corresponding to the concentrated beam domain.

In a scenario in which user equipments are distributed densely and a collective location changes greatly, at least two vertical areas are obtained through division in a physically vertical dimension of a cell coverage area of a massive MIMO cell, and each vertical area corresponds to one beam domain. The transceiver may obtain the user equipment distribution information of the beam domain in a manner of periodically monitoring user equipment distribution information of a beam domain in the massive MIMO cell, channel sounding, or the like. The user equipment herein is actually a terminal that may establish a communications connection to an access network device, for example, a smartphone. Then, the processor determines the information about the concentrated beam domain based on the user equipment distribution information, where the concentrated beam domain is the beam domain in which the quantity of user equipments covered in all beam domains exceeds the quantity threshold, and a size of the quantity threshold is preset. Compared with the information about the historical concentrated beam domain, if the information about the concentrated beam domain satisfies the preset condition, it indicates that the broadcast beam domain needs to be adjusted. The broadcast beam domain is adjusted based on the information about the concentrated beam domain, and the main lobe direction of the broadcast beam domain is adjusted to the beam domain corresponding to the concentrated beam domain, thereby dynamically adjusting the broadcast beam domain by using the user equipment distribution information. Compared with statically configuring the broadcast beam domain in a conventional manner, flexibly and dynamically adjusting the broadcast beam domain is applicable to the scenario in which the user equipments are distributed densely and the collective location changes greatly, so that user channel quality may be improved effectively, thereby improving a cell pairing rate, and further improving cell spectrum efficiency and a user-perceived rate.

A fourth aspect of the present disclosure provides a computer-readable storage medium, including an instruction, where when being run on a computer, the instruction enables the computer to perform the method for adjusting the broadcast beam domain.

A fifth aspect of the present disclosure provides a computer program product including an instruction, where when being run on a computer, the instruction enables the computer to perform the method for adjusting the broadcast beam domain.

A sixth aspect of the present disclosure provides a chip system. The chip system includes a processor, configured to support an access network device in implementing a function mentioned in the foregoing aspects, for example, sending or processing data and/or information mentioned in the foregoing method. In one embodiment, the chip system further includes a memory. The memory is configured to store a program instruction and data that are suitable for the access network device. The chip system may include a chip, or may include a chip and another discrete device.

Based on the foregoing description, in the scenario in which the user equipments are distributed densely and the collective location changes greatly, because a main lobe direction of the broadcast beam domain for statically configuring the broadcast beam domain in a conventional manner is fixed, after the collective location of the user equipments changes, a large quantity of user equipments are no longer located in an area in the main lobe direction of the broadcast beam domain, and the user channel quality is necessarily degraded. However, in the present disclosure, the user equipment distribution information of the beam domain can be obtained, the information about the concentrated beam domain in which the user equipments are collectively distributed is determined based on the user equipment distribution information, and after the collective location of the user equipments changes, the broadcast beam domain can be adjusted based on the information about the concentrated beam domain, so that the main lobe direction of the broadcast beam domain is adjusted to the beam domain corresponding to the concentrated beam domain, thereby improving the user channel quality, and further improving the cell pairing rate, the cell spectrum efficiency, and the user-perceived rate.

BRIEF DESCRIPTION OF DRAWINGS

To describe the technical solutions in embodiments of the present disclosure more clearly, the following briefly describes the accompanying drawings required for describing the embodiments.

DESCRIPTION OF EMBODIMENTS

Figure 1:
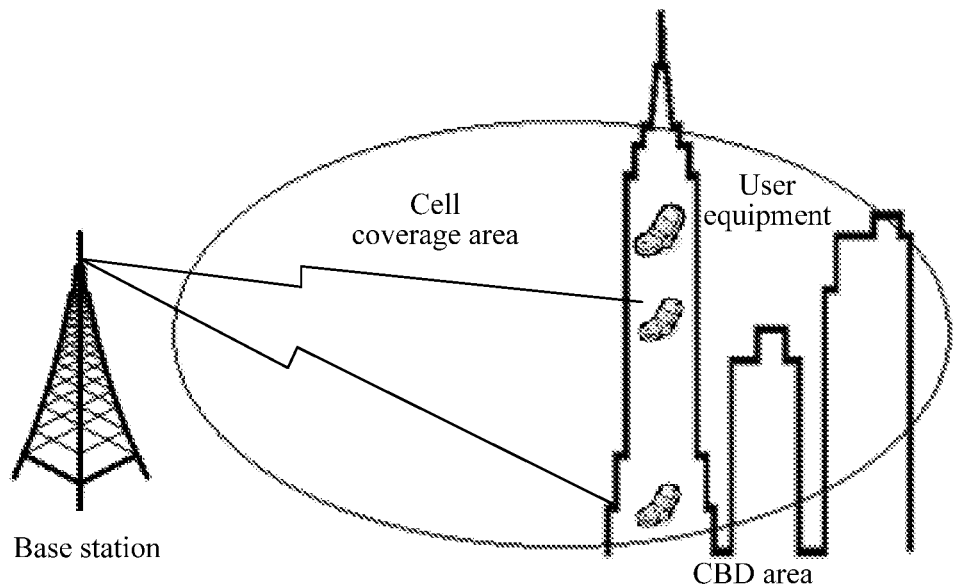
FIG. 1 is a schematic diagram of a cell coverage area of a massive MIMO cell.

The present disclosure provides a method and apparatus for adjusting a broadcast beam domain, used to adjust the broadcast beam domain based on user equipment distribution information of a beam domain, and is applicable to a scenario in which user equipments are distributed densely and a collective location changes greatly, to improve user channel quality.

The following clearly and describes the technical solutions in the present disclosure with reference to the accompanying drawings in the present disclosure. Apparently, the described embodiments are merely some rather than all of the embodiments of the present disclosure.

A system architecture or scenario to which the present disclosure is applied is first briefly described.

The present disclosure may be used in but not limited to an LTE system and an evolved system thereof, and may also be used in a 5G technology. For ease of understanding, the present disclosure is described in detail by using an LTE network as an example. Persons skilled in the art may understand that the solutions in the embodiments of the present disclosure may be applied to another wireless communications network, for example, a universal mobile telecommunications system (UMTS) network, a network backward compatible with LTE, a 4.5G network, a 5G network, or a subsequent evolved network. In a massive MIMO technology, a wider and deeper 3D wireless coverage capability is obtained by using a large-scale multiple-antenna technology. The massive MIMO technology is an important component in a solution of a 4.5G evolved system, and is also one of smooth evolution 5G technologies. To improve wireless spectrum utilization, in the massive MIMO technology, the wireless spectrum utilization of a system may be improved greatly by using spatial multiplexing and a pairing policy. However, considering that the massive MIMO technology has a wider coverage area and a stronger penetration power, the massive MIMO technology is mainly applicable to a central business district (CBD) area in which a traffic volume is high and there are many users.

In the present disclosure, terms "network" and "system" are often interchangeably used, but meanings of the terms can be understood by persons skilled in the art. User equipment (UE) is a terminal device having a communication function, and may include a handheld device, a vehicle-mounted device, a wearable device, a computing device that has a wireless communication function, another processing device connected to a wireless modem, and the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless telephone set, and a wireless local loop station. For ease of description, the names are briefly referred to as user equipment or UE in the present disclosure. A base station (BS) may also be referred to as a base station device, and is a device that is deployed in a radio access network and that is configured to provide a wireless communication function. The base station may have different names in different wireless access systems. For example, the base station is referred to as a NodeB in an UMTS network, while the base station is referred to as an evolved NodeB (eNB or eNodeB) in an LTE network.

Figure 2:
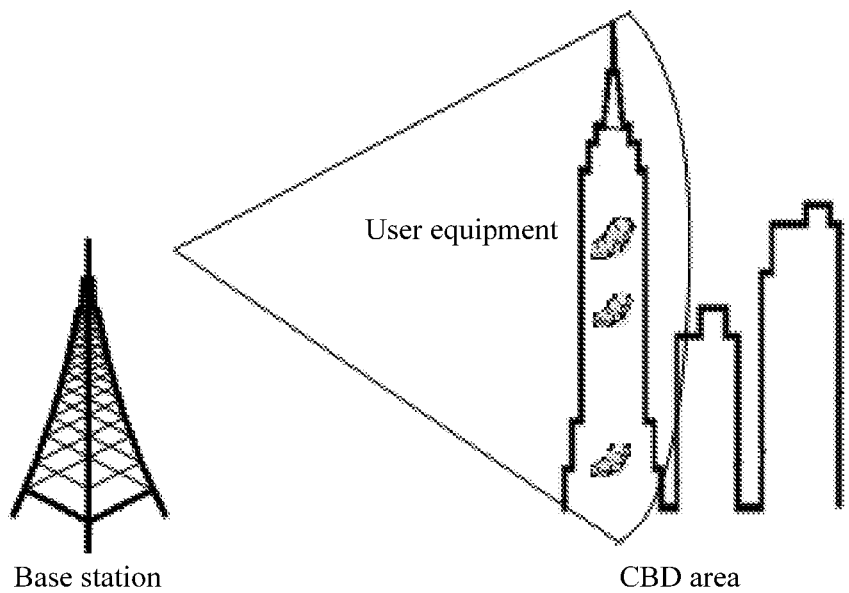
FIG. 2 is a schematic diagram of a coverage area of a broadcast beam domain in a high-rise breadth coverage scenario.
Figure 3:
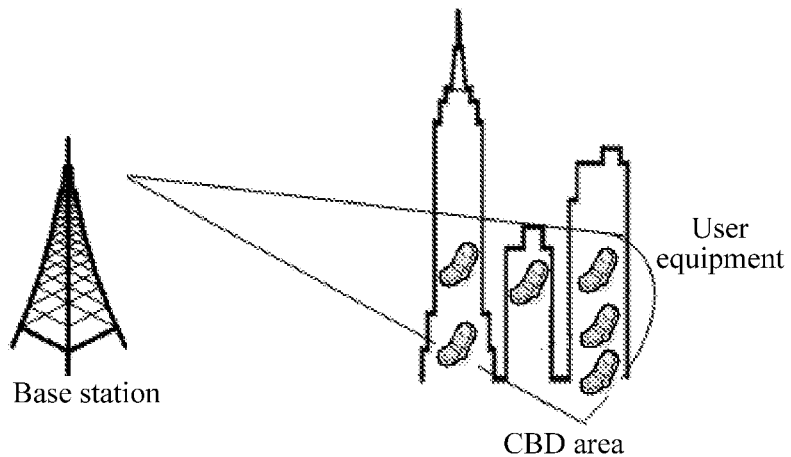
FIG. 3 is a schematic diagram of a coverage area of a broadcast beam domain in a low-rise depth coverage scenario.

Currently, a schematic diagram of a cell coverage area of the massive MIMO cell is shown in FIG. 1, and the CBD area is in a cell coverage area of a cell to which the base station belongs. If a conventional manner for covering a wireless network of the massive MIMO cell is selecting, through network optimizer planning before a station is started, to configure a main lobe direction of a broadcast beam domain, it indicates that a conventional configuration of the broadcast beam domain of the massive MIMO cell is static. To be specific, a broadcast beam weighted value is fixed. FIG. 2 is a scenario of high-rise breadth coverage configured for the broadcast beam domain when user equipments are concentrated in a high floor; and FIG. 3 is a scenario of low-rise depth coverage configured for the broadcast beam domain when user equipments are concentrated in a low floor.

However, a conventional configuration of the broadcast beam domain of the massive MIMO cell is static, and is not applicable to a scenario in which the user equipments are distributed densely and a collective location changes greatly. For example, by using FIG. 3 as an example, low floors of the CBD area are usually markets, and high floors are usually office areas. Therefore, the user equipments are mainly in the low floors at non-working hours, and the user equipments are mainly in the high floors at working hours. Therefore, based on the coverage area of the main lobe direction of the broadcast beam domain shown in FIG. 3, at the working hours, user channel quality of a large quantity of user equipments in the high floors is degraded, and some user equipments even cannot access the cell, so that a cell pairing rate is reduced, thereby affecting cell spectrum efficiency and a user-perceived rate.

To resolve the foregoing problems, the present disclosure provides a method for adjusting a broadcast beam domain, to resolve a problem that in the scenario in which the user equipments are distributed densely and the collective location changes greatly, after a batch of user equipments leave the coverage area of the main lobe direction of the broadcast beam domain, the user channel quality is degraded, and some user equipments even cannot access the cell, so that the cell pairing rate is reduced, thereby affecting the cell spectrum efficiency and the user-perceived rate. The following describes the method in detail.

Figure 4:
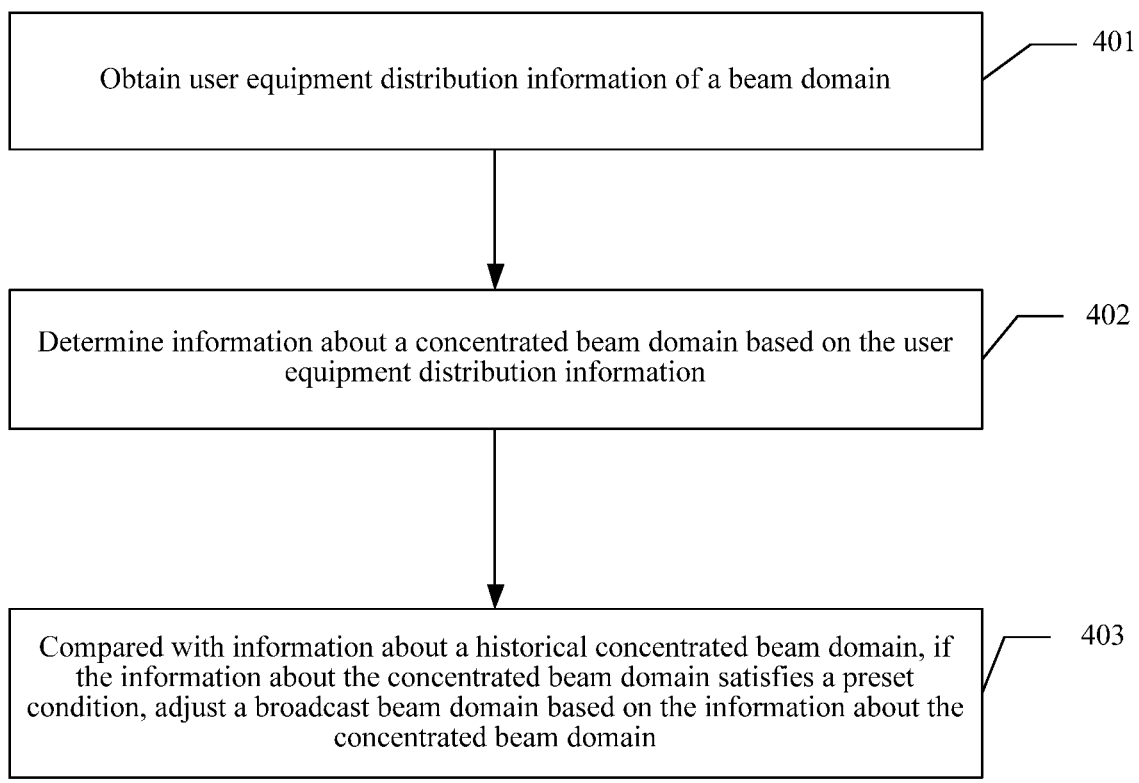
FIG. 4 is a schematic flowchart of an embodiment of a method for adjusting a broadcast beam domain according to the present disclosure.

Referring to FIG. 4, an embodiment of the present disclosure provides a method for adjusting a broadcast beam domain, including the following operations.

Operation 401. Obtain user equipment distribution information of a beam domain.

Figure 5:
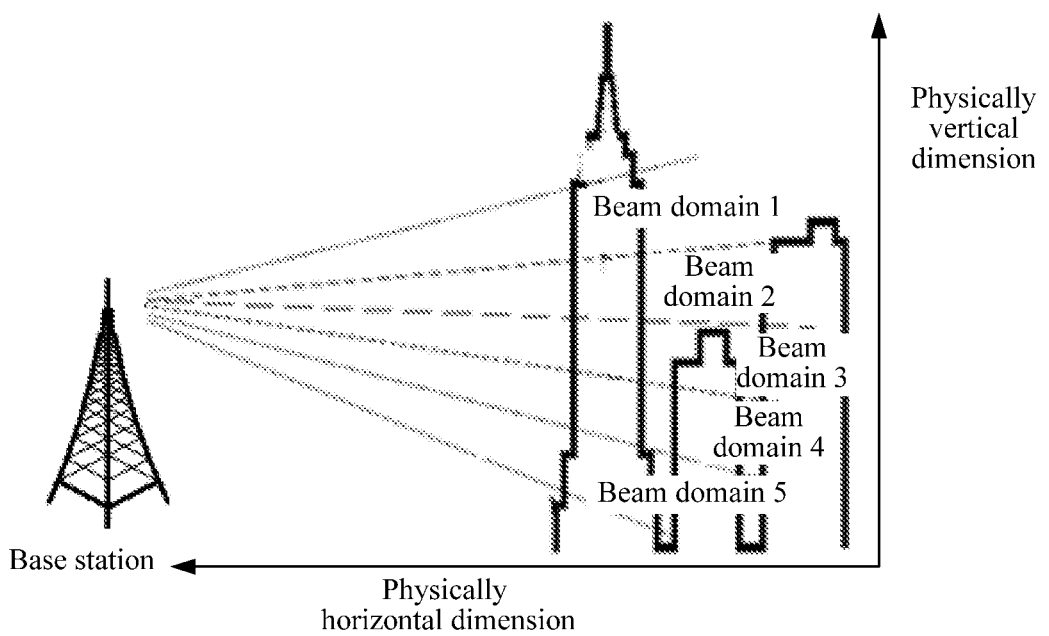
FIG. 5 is a schematic diagram of a beam domain of a massive MIMO cell according to the present disclosure.

In this embodiment, a massive MIMO cell is a cell covered by an access network device, a coverage area of the massive MIMO cell includes the CBD area shown in FIG. 3, and a batch of user equipments in the CBD area has features of dense distribution and a great collective location change. At least two vertical areas are obtained through division in a physically vertical dimension of the cell coverage area. As shown in FIG. 5, a physically horizontal dimension is a dimension of a base station relative to a horizontal plane, and the physically vertical dimension is a dimension vertical to the horizontal plane. In FIG. 5, five vertical areas are obtained through division in the physically vertical dimension, and five beam domains are formed. In actual application, a quantity of beam domains is not limited to 5. The access network device transmits a radio signal by dividing, in a vertical space domain and a horizontal space domain, the radio signal into beams in a plurality of different directions, and transmitting the radio signal by using the beams in the plurality of different directions. The vertical area obtained through division from an area covered by the beams is a beam domain. The access network device may obtain user equipment distribution information of a beam domain of the massive MIMO cell through periodical monitoring. The user equipment distribution information indicates a distribution situation of user equipments located in a coverage area of each beam domain in the massive MIMO cell, and may be specifically a quantity of user equipments covered by each beam domain. The user equipment distribution information of the beam domain may also be obtained in a manner of channel sounding, or the like. In addition, the user equipment distribution information may be further obtained in another manner. This is not specifically limited.

Operation 402. Determine information about a concentrated beam domain based on the user equipment distribution information.

In this embodiment, the quantity of user equipments covered by each beam domain in the massive MIMO cell can be learned based on the user equipment distribution information, and a beam domain in which the quantity of user equipments covered by the beam domain exceeds a quantity threshold is selected as the concentrated beam domain, and an identifier of the beam domain corresponding to the concentrated beam domain is used as the information about the concentrated beam domain. For example, a quantity of user equipments covered by a beam domain N is 100, and a value set for the quantity threshold is 80. In this case, the beam domain N can be determined as the concentrated beam domain, and the information about the concentrated beam domain is the beam domain N. In addition, the information about the concentrated beam domain may be further determined in another manner. This is not specifically limited.

Operation 403. Adjust a broadcast beam domain based on the information about the concentrated beam domain.

In this embodiment, to compensate for signal fading and distortion caused by a space loss, a multipath effect, or the like in a radio signal propagation process, and to reduce interference between user equipments in a same channel, before the access network device transmits the radio signal by using the beams in the plurality of directions, digital beamforming further needs to be performed, to form a beam with a larger coverage area, that is, the broadcast beam. An area covered by the broadcast beam is referred to as the broadcast beam domain. Because the information about the concentrated beam domain is determined by using the user equipment distribution information, a main lobe direction of the broadcast beam domain in this case should be directed to the beam domain corresponding to the concentrated beam domain, so that user channel quality of user equipment covered by the concentrated beam domain is optimal. However, when a broadcast beam is transmitted last time, information about a historical concentrated beam domain of the main lobe direction of the broadcast beam domain is recorded and stored. Comparing the information about the concentrated beam domain with the information about the historical concentrated beam domain, it may be preset that when the information about the concentrated beam domain is consistent with the information about the historical concentrated beam domain, the information about the concentrated beam domain does not satisfy a preset condition, or another condition may be preset. This is not specifically limited. Assuming that the information about the concentrated beam domain is a beam domain N, and the information about the historical concentrated beam domain is a beam domain N-1, in this case, the information about the concentrated beam domain is not consistent with the information about the historical concentrated beam domain. Compared with the information about the historical concentrated beam domain, the information about the concentrated beam domain satisfies the preset condition, indicating that the broadcast beam domain needs to be adjusted. The broadcast beam domain is adjusted based on the information about the concentrated beam domain, and the main lobe direction of the broadcast beam domain is adjusted to the beam domain corresponding to the concentrated beam domain.

In this embodiment of the present disclosure, in a scenario in which user equipments are distributed densely and a collective location changes greatly, the at least two vertical areas are obtained through division in the physically vertical dimension of the cell coverage area of the massive MIMO cell, and each vertical area corresponds to one beam domain. The user equipment distribution information of the beam domain may be obtained in the manner of periodically monitoring the user equipment distribution information of the beam domain in the massive MIMO cell, the channel sounding, or the like. Then, the information about the concentrated beam domain is determined based on the user equipment distribution information. Compared with the information about the historical concentrated beam domain, when the information about the concentrated beam domain satisfies the preset condition, the broadcast beam domain is adjusted based on the information about the concentrated beam domain, and the main lobe direction of the broadcast beam domain is adjusted to the beam domain corresponding to the concentrated beam domain, thereby dynamically adjusting the broadcast beam domain by using the user equipment distribution information. Compared with statically configuring the broadcast beam domain in a conventional manner, flexibly and dynamically adjusting the broadcast beam domain is applicable to the scenario in which the user equipments are distributed densely and the collective location changes greatly, so that user channel quality may be improved effectively, thereby improving a cell pairing rate, and further improving cell spectrum efficiency and a user-perceived rate.

The embodiment shown in FIG. 4 includes at least two beam domains, and the beam domain is a vertical area in the physically vertical dimension of the cell coverage area. The following describes how to form the beam domain by using embodiments.

In one embodiment, in some embodiments of the present disclosure, before the obtaining user equipment distribution information of a beam domain, the method further includes:

obtaining direction angle information of the vertical area, where there are at least two vertical areas, and the vertical area is obtained through division in the physically vertical dimension of the cell coverage area;

setting a cell uplink beam matrix based on the direction angle information; and determining the at least two beam domains based on the cell uplink beam matrix, where one beam domain corresponds to one vertical area.

In this embodiment of the present disclosure, because currently, the massive MIMO cell transmits the broadcast beam in a coverage form of FIG. 2 or FIG. 3, a manner for sounding a location of the user equipment is usually obtaining distance information of the user equipment by receiving channel sounding information of the user equipment, a location of the user equipment in a horizontal dimension can be learned only through the distance information, but a location of the user equipment in the vertical dimension cannot be learned, a specific area in which the user equipment is located cannot be determined. Therefore, the at least two vertical areas need to be obtained through division in the physically vertical dimension of the cell coverage area, direction angle information of each vertical area is obtained, and the cell uplink beam matrix is set based on the direction angle information. Because a quantity of beam domains and a corresponding vertical area are determined by the cell uplink beam matrix, the at least two beam domains may be determined based on the cell uplink beam matrix, where one beam domain corresponds to one vertical area.

In the foregoing embodiment, because the beam domain of the cell coverage area of the massive MIMO cell is determined by the cell uplink beam matrix, after weighted processing is performed on the channel sounding information of the user equipment and the cell uplink beam matrix, the obtained weighted result can be used as a standard for determining the beam domain in which the user equipment is located. The following describes specific implementations by using embodiments.

In one embodiment, in some embodiments of the present disclosure, the obtaining user equipment distribution information of a beam domain includes:

obtaining channel sounding information of a user equipment, where there is at least one user equipment;

performing weighted processing on the channel sounding information and the cell uplink beam matrix, to obtain a weighted result; and determining, based on the weighted result, a beam domain in which the user equipment is located, to obtain the user equipment distribution information of the beam domain.

In this embodiment of the present disclosure, the user equipment in the cell coverage area of the massive MIMO cell periodically sends the channel sounding information, and obtains the channel sounding information of the user equipment, where the channel sounding information is specifically channel sounding signal received power (SRS RSRP). The SRS RSRP describes reference signal received power (RSRP) when the user equipment receives a channel sounding reference signal (SRS) delivered by the massive MIMO cell. The weighted processing is separately performed on SRS RSRP of each user equipment and the cell uplink beam matrix, to obtain a weighted result corresponding to each user equipment. Because the beam domain of the cell coverage area of the massive MIMO cell is determined by the cell uplink beam matrix, the weighted result obtained by performing the weighted processing on the SRS RSRP and the cell uplink beam matrix can be used as a standard for determining the beam domain in which the user equipment is located. Because the beam domain in which each user equipment is located can be determined based on the weighted result corresponding to each user equipment, the quantity of user equipments covered by each beam domain can be finally determined. Therefore, the user equipment distribution information of the beam domain can be obtained.

In the foregoing embodiments, after the user equipment distribution information is determined, the information about the concentrated beam domain further needs to be selected based on the user equipment distribution information. Because a user channel quality problem of the massive MIMO cell needs to be resolved, a most important solution is to first satisfy user channel quality of an area in which there are a large quantity of user equipments. The quantity of user equipments covered by each beam domain becomes an important indicator for selecting the concentrated beam domain. Details are described in the following.

In one embodiment, in some embodiments of the present disclosure, the determining information about a concentrated beam domain based on the user equipment distribution information includes:

obtaining, based on the user equipment distribution information, the quantity of user equipments covered by each beam domain; and if the quantity of user equipments exceeds the quantity threshold, determining a beam domain corresponding to the quantity of user equipments as the concentrated beam domain, and recording the information about the concentrated beam domain, where there is at least one concentrated beam domain.

In the embodiments of the present disclosure, the user equipment distribution information of the beam domain is already learned, and the quantity of user equipments covered by each beam domain may be obtained. Assuming that there are three beam domains, a quantity of user equipments covered by a beam domain 1 is 20, a quantity of user equipments covered by a beam domain 2 is 30, and a quantity of user equipments covered by a beam domain 3 is 50, a total quantity of user equipments is 20+30+50=100. A ratio of the quantity of user equipments covered by each beam domain to the total quantity of user equipments is a ratio of the user equipments of each beam domain. A preset threshold (for example, 0.4) is preset for the ratio of a quantity of users, and the quantity threshold is the preset threshold multiplied by the total quantity of user equipments. If the quantity of user equipments covered by one beam domain exceeds the quantity threshold, the beam domain is used as the concentrated beam domain, where there may be one or more concentrated beam domains, and the information about the concentrated beam domain is recorded. A ratio of the user equipments in the beam domain 1 is 0.2, a ratio of the user equipments in the beam domain 2 is 0.3, a ratio of the user equipments in the beam domain 3 is 0.5, and the quantity threshold is 0.4*100=40. Because the quantity of user equipments covered by the beam domain 3 is 50, exceeding the quantity threshold 40, the beam domain 3 is used as the concentrated beam domain, and the information about the concentrated beam domain is recorded as the beam domain 3.

In the foregoing embodiments, a case in which the information about the concentrated beam domain is obtained by using the user equipment distribution information based on a principle of user equipment quantity first, thereby improving the user channel quantity of the massive MIMO cell to the utmost extent is described.

It should be noted that in the foregoing embodiments, the information about the concentrated beam domain is determined based on the principle of the user equipment quantity first. In actual application, the concentrated beam domain may be alternatively determined based on a user priority of the user equipments covered by each beam domain, and in a user priority manner, satisfying user channel quality of a user with a high priority as much as possible is considered. In addition, the information about the concentrated beam domain may be determined in another manner. This is not specifically limited.

In the foregoing embodiments, after the information about the concentrated beam domain is obtained, whether the broadcast beam domain needs to be adjusted further needs to be compared with the information about the historical concentrated beam domain used when the broadcast beam is transmitted last time. When the preset condition is satisfied, the broadcast beam domain is adjusted. Details are shown as follows.

In one embodiment, in some embodiments of the present disclosure, before the adjusting a broadcast beam domain based on the information about the concentrated beam domain, the method further includes:

obtaining the information about the historical concentrated beam domain, where the historical concentrated beam domain is a beam domain corresponding to the broadcast beam domain used when a broadcast beam is transmitted last time;

if the historical concentrated beam domain and the concentrated beam domain reach preset area isolation, determining that compared with the information about the historical concentrated beam domain, the information about the concentrated beam domain satisfies the preset condition.

In the embodiments of the present disclosure, assuming that the concentrated beam domain is a beam domain 3 in which there is a maximum quantity of covered user equipments, a main lobe direction of the broadcast beam domain in this case should correspond to the beam domain 3, so that the user channel quality in the beam domain is optimal. However, the record historical concentrated beam domain used when the broadcast beam is transmitted last time corresponds to the beam domain 1. Whether the historical concentrated beam domain and the concentrated beam domain reach the preset area isolation is determined, where the preset area isolation is preset. When the user equipment is located in different beam domains, a degraded degree of the user channel quality is considered. For example, when the main lobe direction of the broadcast beam domain is the beam domain 1, user channel quality of user equipment in an adjacent beam domain (a beam domain 2) is in an allowed range while a degraded degree of user channel quality of user equipment in the beam domain 3 exceeds the allowed range, the preset area isolation is the adjacent beam domain.

When the historical concentrated beam domain is the beam domain 1, and the concentrated beam domain is the beam domain 3, the beam domain 1 and the beam domain 3 are not adjacent beam domains. The historical concentrated beam domain and the concentrated beam domain reach the preset area isolation, indicating that if a current broadcast beam is transmitted based on the broadcast beam last time, the user channel quality of the user equipment in the beam domain 3 cannot be ensured, and compared with the information about the historical concentrated beam domain, the information about the concentrated beam domain satisfies the preset condition. If the historical concentrated beam domain is the beam domain 1, and the concentrated beam domain is also the beam domain 1, it indicates that if the currently to-be-transmitted broadcast beam is transmitted based on the broadcast beam domain last time, the user channel quality of the user equipment in the beam domain 1 is in the allowed range, and compared with the information about the historical concentrated beam domain, the information about the concentrated beam domain does not satisfy the preset condition.

In one embodiment, in some embodiments of the present disclosure, the adjusting a broadcast beam domain based on the information about the concentrated beam domain includes:

determining a broadcast beam weighted value of the concentrated beam domain based on the information about the concentrated beam domain;

determining a historical broadcast beam weighted value of the historical concentrated beam domain based on the information about the historical concentrated beam domain; and adjusting the historical broadcast beam weighted value as the broadcast beam weighted value, so that the main lobe direction of the broadcast beam domain is adjusted to the concentrated beam domain.

In the embodiments of the present disclosure, compared with the information about the historical concentrated beam domain, when the information about the concentrated beam domain satisfies the preset condition, it indicates that the broadcast beam domain needs to be adjusted. The broadcast beam weighted value of the concentrated beam domain is determined based on the information about the concentrated beam domain, and before the adjustment, the broadcast beam may be transmitted by using each beam domain as the main lobe direction of the broadcast beam domain in advance, thereby recording a preset broadcast beam weighted value when each beam domain is used as the main lobe direction of the broadcast beam domain. Then, after the concentrated beam domain is determined, the preset broadcast beam weighted value corresponding to the concentrated beam domain may be selected as the broadcast beam weighted value from a database. Similarly, the historical broadcast beam weighted value of the historical concentrated beam domain can be determined based on the information about the historical concentrated beam domain, and the historical broadcast beam weighted value of the historical concentrated beam domain is replaced with the broadcast beam weighted value corresponding to the concentrated beam domain. The main lobe direction of the broadcast beam domain may be directed to the concentrated beam domain, and a main lobe of the broadcast beam transmitted by using the broadcast beam weighted value covers the concentrated beam domain, thereby flexibly adjusting the broadcast beam domain.

It should be noted that in the foregoing embodiments, the broadcast beam domain is adjusted by using the preset broadcast beam weighted value and the user equipment distribution information. In addition, the broadcast beam weighted value when the main lobe direction of the broadcast beam domain is directed to the concentrated beam domain may be further obtained through online calculation, discrete calculation, or simulation, and then the broadcast beam domain is adjusted.

The foregoing embodiments describe the method for adjusting the broadcast beam domain provided in the present disclosure, and the following describes an apparatus for adjusting a broadcast beam domain in detail by using embodiments.

Figure 6:
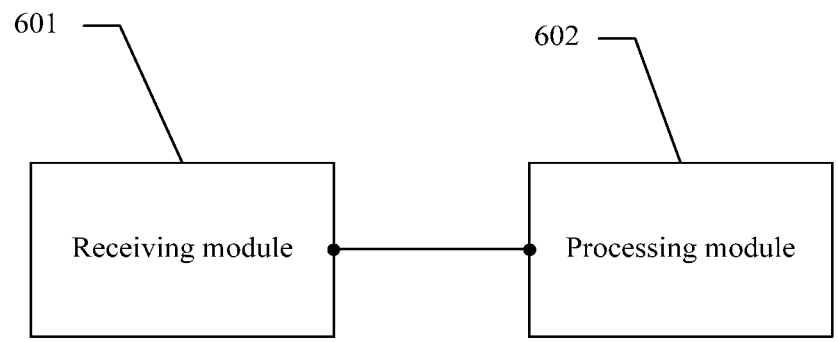
FIG. 6 is a schematic structural diagram of an embodiment of an apparatus for adjusting a broadcast beam domain according to the present disclosure.

Referring to FIG. 6, an embodiment of the present disclosure provides an apparatus for adjusting a broadcast beam domain, including:

a receiving module 601, configured to obtain user equipment distribution information of a beam domain, where there are at least two beam domains, and the beam domain is a vertical area in a physically vertical dimension of a cell coverage area;

a processing module 602, configured to determine information about a concentrated beam domain based on the user equipment distribution information, where the concentrated beam domain is a beam domain in which a quantity of covered user equipments exceeds a quantity threshold, and the processing module 602 is further configured to: compared with information about a historical concentrated beam domain, when the information about the concentrated beam domain satisfies a preset condition, adjust a broadcast beam domain based on the information about the concentrated beam domain, so that a main lobe direction of the broadcast beam domain is adjusted to a beam domain corresponding to the concentrated beam domain.

In this embodiment of the present disclosure, in a scenario in which user equipments are distributed densely and a collective location changes greatly, at least two vertical areas are obtained through division in a physically vertical dimension of a cell coverage area of a massive MIMO cell, and each vertical area corresponds to one beam domain. The receiving module 601 may obtain the user equipment distribution information in a manner of periodically monitoring user equipment distribution information of a beam domain in the massive MIMO cell, channel sounding, or the like. Then the processing module 602 determines the information about the concentrated beam domain based on the user equipment distribution information, where the concentrated beam domain is the beam domain in which the quantity of user equipments covered in all beam domains exceeds the quantity threshold, and a size of the quantity threshold is preset. Compared with the information about the historical concentrated beam domain, if the information about the concentrated beam domain satisfies the preset condition, it indicates that the broadcast beam domain needs to be adjusted. The broadcast beam domain is adjusted based on the information about the concentrated beam domain, and the main lobe direction of the broadcast beam domain is adjusted to the beam domain corresponding to the concentrated beam domain, thereby dynamically adjusting the broadcast beam domain by using the user equipment distribution information. Compared with statically configuring the broadcast beam domain in a conventional manner, flexibly and dynamically adjusting the broadcast beam domain is applicable to the scenario in which the user equipments are distributed densely and the collective location changes greatly, so that user channel quality may be improved effectively, thereby improving a cell pairing rate, and further improving cell spectrum efficiency and a user-perceived rate.

In one embodiment, in some embodiments of the present disclosure, the receiving module 601 is further configured to obtain direction angle information of the vertical area, where there are at least two vertical areas, and the vertical area is obtained through division in the physically vertical dimension of the cell coverage area;

the processing module 602 is further configured to set a cell uplink beam matrix based on the direction angle information; and the processing module 602 is further configured to determine the at least two beam domains based on the cell uplink beam matrix, where one beam domain corresponds to one vertical area.

In this embodiment of the present disclosure, because currently, a manner for sounding a location of the user equipment is usually obtaining distance information of the user equipment by receiving channel sounding information of the user equipment, a location of the user equipment in a horizontal dimension can be learned only through the distance information, but a location of the user equipment in the vertical dimension cannot be learned, a specific area in which the user equipment is located cannot be determined. Therefore, the at least two vertical areas are obtained through division in the physically vertical dimension of the cell coverage area, the receiving module 601 obtains direction angle information of each vertical area, and the processing module 602 sets the cell uplink beam matrix based on the direction angle information. Because a quantity of beam domains and a corresponding vertical area are determined by the cell uplink beam matrix, the at least two beam domains may be determined based on the cell uplink beam matrix, where one beam domain corresponds to one vertical area.

In one embodiment, in some embodiments of the present disclosure, the receiving module 601 is further configured to obtain channel sounding information of a user equipment, where there is at least one user equipment;

the processing module 602 is further configured to perform weighted processing on the channel sounding information and the cell uplink beam matrix, to obtain a weighted result; and the processing module 602 is further configured to determine, based on the weighted result, a beam domain in which the user equipment is located, to obtain the user equipment distribution information of the beam domain.

In this embodiment of the present disclosure, the user equipment in the cell coverage area periodically sends the channel sounding information, and the receiving module 601 obtains the channel sounding information of the user equipment, where the channel sounding information is specifically SRS RSRP. The SRS RSRP describes RSRP when the user equipment receives an SRS delivered by the massive MIMO cell. The processing module 602 separately performs weighted processing on SRS RSRP of each user equipment and the cell uplink beam matrix, to obtain a weighted result corresponding to each user equipment. Because the beam domain of the cell coverage area of the massive MIMO cell is determined by the cell uplink beam matrix, the weighted result obtained by the processing module 602 by performing the weighted processing on the SRS RSRP and the cell uplink beam matrix can be used as a standard for determining the beam domain in which the user equipment is located. Because the beam domain in which each user equipment is located can be determined based on the weighted result corresponding to each user equipment, the quantity of user equipments covered by each beam domain can be finally determined. Therefore, the user equipment distribution information of the beam domain can be obtained.

In one embodiment, in some embodiments of the present disclosure, the processing module 602 is further configured to obtain, based on the user equipment distribution information, the quantity of user equipments covered by each beam domain; and the processing module 602 is further configured to: when the quantity of user equipments exceeds the quantity threshold, determine a beam domain corresponding to the quantity of user equipments as the concentrated beam domain, and record the information about the concentrated beam domain, where there is at least one concentrated beam domain.

In this embodiment of the present disclosure, after determining the user equipment distribution information, the processing module 602 further needs to determine, based on the user equipment distribution information, the information about the concentrated beam domain. Because a user channel quality problem of the massive MIMO cell needs to be resolved, a most important solution is to first satisfy user channel quality of the beam domain in which the quantity of user equipments exceeds the quantity threshold. The processing module 602 may obtain, based on the user equipment distribution information of the beam domain, the quantity of user equipments covered by each beam domain, and can obtain a total quantity of user equipments based on a sum of quantities of user equipments covered by all the beam domain. A ratio of the quantity of user equipments covered by each beam domain to the total quantity of user equipments is a ratio of the user equipments of each beam domain. A preset threshold is preset for the ratio of the user equipments, and the quantity threshold is the preset threshold multiplied by the total quantity of user equipments. If the quantity of user equipments covered by one beam domain exceeds the quantity threshold, the processing module uses the beam domain as the concentrated beam domain, where there may be one or more concentrated beam domains, and records the information about the concentrated beam domain.

In one embodiment, in some embodiments of the present disclosure, the receiving module 601 is further configured to obtain the information about the historical concentrated beam domain, where the historical concentrated beam domain is a beam domain corresponding to the broadcast beam domain used when a broadcast beam is transmitted last time; and the processing module 602 is further configured to: when the historical concentrated beam domain and the concentrated beam domain reach preset area isolation, determine that compared with the information about the historical concentrated beam domain, the information about the concentrated beam domain satisfies the preset condition.

In this embodiment of the present disclosure, assuming that the concentrated beam domain is a beam domain 1, a main lobe direction of a broadcast beam in this case should be directed to the beam domain 1, so that the user channel quality of the user equipment in the beam domain 1 is optimal. However, the beam domain that corresponds to the broadcast beam domain used when the broadcast beam is transmitted last time and that is obtained by the receiving module 601 is a beam domain 3. The processing module 602 determines whether the historical concentrated beam domain and the concentrated beam domain reach the preset area isolation, where the preset area isolation is preset. When the user equipment is located in different beam domains, a degraded degree of the user channel quality is considered. For example, when the main lobe direction of the broadcast beam domain is the beam domain 1, user channel quality of user equipment in an adjacent beam domain (a beam domain 2) is in an allowed range while a degraded degree of user channel quality of user equipment in the beam domain 3 exceeds the allowed range, where the user channel quality is of the user equipment in the beam domain 3, the preset area isolation is the adjacent beam domain. When the historical concentrated beam domain is the beam domain 3, and the concentrated beam domain is the beam domain 1, the beam domain 1 and the beam domain 3 are not adjacent beam domains. The historical concentrated beam domain and the concentrated beam domain reach the preset area isolation, indicating that if a currently to-be-transmitted broadcast beam is transmitted based on the broadcast beam domain last time, the user channel quality of the user equipment in the beam domain 3 cannot be ensured, and compared with the information about the historical concentrated beam domain, the information about the concentrated beam domain satisfies the preset condition. If the historical concentrated beam domain is the beam domain 1, and the concentrated beam domain is also the beam domain 1, it indicates that if the currently to-be-transmitted broadcast beam is transmitted based on the broadcast beam domain last time, the user channel quality of the user equipment in the beam domain 1 is in the allowed range, and the processing module 602 determines that compared with the information about the historical concentrated beam domain, the information about the concentrated beam domain does not satisfy the preset condition.

In one embodiment, in some embodiments of the present disclosure, the processing module 602 is further configured to determine a broadcast beam weighted value of the concentrated beam domain based on the information about the concentrated beam domain;

the processing module 602 is further configured to determine a historical broadcast beam weighted value of the historical concentrated beam domain based on the information about the historical concentrated beam domain; and the processing module 602 is further configured to adjust the historical broadcast beam weighted value as the broadcast beam weighted value, so that the main lobe direction of the broadcast beam domain is adjusted to the concentrated beam domain.

In this embodiment of the present disclosure, compared with the information about the historical concentrated beam domain, when the information about the concentrated beam domain satisfies the preset condition, it indicates that the broadcast beam domain needs to be adjusted. The processing module 602 determines, based on the information about the concentrated beam domain, the broadcast beam weighted value of the concentrated beam domain, and before the adjustment, the broadcast beam may be transmitted by using each beam domain as the main lobe direction of the broadcast beam domain in advance, thereby recording a preset broadcast beam weighted value when each beam domain is used as the main lobe direction of the broadcast beam domain. After determining the concentrated beam domain, the processing module 602 may select a preset broadcast beam weighted value corresponding to the concentrated beam domain as the broadcast beam weighted value from a database, and replace the historical broadcast beam weighted value of the historical concentrated beam domain with the broadcast beam weighted value corresponding to the concentrated beam domain. The main lobe direction of the broadcast beam domain may be directed to the concentrated beam domain, and a main lobe of the broadcast beam transmitted by using the broadcast beam weighted value covers the concentrated beam domain, thereby flexibly adjusting the broadcast beam domain.

In the foregoing embodiments, the apparatus for adjusting the broadcast beam domain is described in a form of modularization, and in the following, a case in which an access network device is used as an entity apparatus of the apparatus for adjusting the broadcast beam domain is described.

Figure 7:
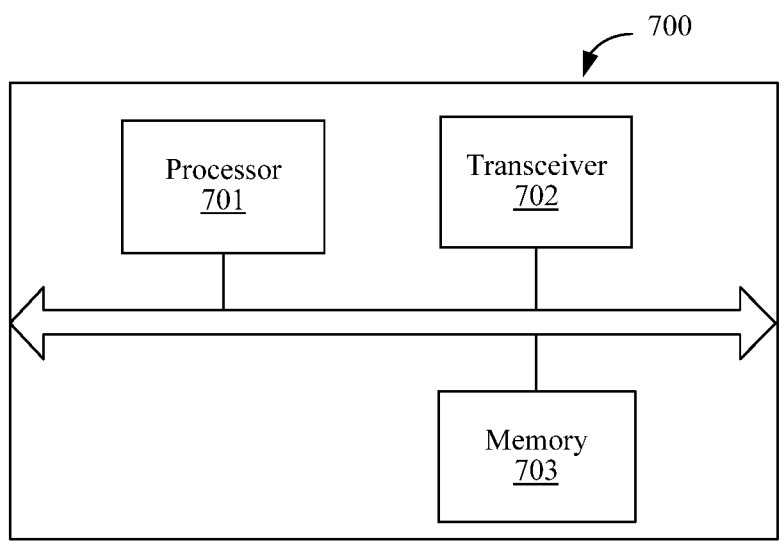
FIG. 7 is a schematic structural diagram of an embodiment of an access network device according to the present disclosure.

Referring to FIG. 7, the present disclosure provides an access network device 700, including:

a processor 701, a transceiver 702, and a memory 703, where the memory 703 is configured to store code executed by the processor 701;

the transceiver 702 is configured to obtain user equipment distribution information of a beam domain, where there are at least two beam domains, and the beam domain is a vertical area in a physically vertical dimension of a cell coverage area;

the processor 701 is configured to determine information about a concentrated beam domain based on the user equipment distribution information, where the concentrated beam domain is a beam domain in which a quantity of covered user equipments exceeds a quantity threshold; and the processor 701 is further configured to: compared with information about a historical concentrated beam domain, when the information about the concentrated beam domain satisfies a preset condition, adjust a broadcast beam domain based on the information about the concentrated beam domain, so that a main lobe direction of the broadcast beam domain is adjusted to a beam domain corresponding to the concentrated beam domain.

In this embodiment of the present disclosure, in a scenario in which user equipments are distributed densely and a collective location changes greatly, at least two vertical areas are obtained through division in a physically vertical dimension of a cell coverage area of a massive MIMO cell, and each vertical area corresponds to one beam domain. The transceiver 702 may obtain the user equipment distribution information of the beam domain in a manner of periodically monitoring user equipment distribution information of a beam domain in the massive MIMO cell, channel sounding, or the like. The user equipment herein is actually a terminal that may establish a communications connection to an access network device, for example, a smartphone. Then, the processor 701 determines the information about the concentrated beam domain based on the user equipment distribution information, where the concentrated beam domain is the beam domain in which the quantity of user equipments covered in all beam domains exceeds the quantity threshold, and a size of the quantity threshold is preset. Compared with the information about the historical concentrated beam domain, if the information about the concentrated beam domain satisfies the preset condition, it indicates that the broadcast beam domain needs to be adjusted. The broadcast beam domain is adjusted based on the information about the concentrated beam domain, and the main lobe direction of the broadcast beam domain is adjusted to the beam domain corresponding to the concentrated beam domain, thereby dynamically adjusting the broadcast beam domain by using the user equipment distribution information. Compared with statically configuring the broadcast beam domain in a conventional manner, flexibly and dynamically adjusting the broadcast beam domain is applicable to the scenario in which the user equipments are distributed densely and the collective location changes greatly, so that user channel quality may be improved effectively, thereby improving a cell pairing rate, and further improving cell spectrum efficiency and a user-perceived rate.

The present disclosure further provides a computer-readable storage medium. The computer-readable storage medium stores an instruction, and when being run on a computer, the instruction enables the computer to perform the method for adjusting the broadcast beam domain described in the foregoing embodiments.

The present disclosure further provides a computer program product including an instruction, where when being run on a computer, the instruction enables the computer to perform the method for adjusting the broadcast beam domain described in the foregoing embodiments.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The present disclosure further provides a chip system. The chip system includes a processor, configured to support the access network device in implementing functions mentioned in the method for adjusting the broadcast beam domain. A chip includes a processing unit and a communications unit. The processing unit may be, for example, a processor, and the communications unit may be, for example, an input/output interface, a pin, or a circuit. The processing unit may execute a computer-executable instruction stored in a storage unit, so that the chip in the terminal performs the method for adjusting the broadcast beam domain.

In one embodiment, the storage unit is a storage unit in the chip, for example, a register or a cache. The storage unit may be further a storage unit outside the chip in the terminal, for example, a read-only memory (ROM), another type of static storage device that can store static information and an instruction, or a random access memory (RAM).

The processor mentioned at any location above may be a general-purpose central processing unit (CPU), a microprocessor, an application-specific integrated circuit (ASIC), or one or more integrated circuits configured to control program execution of the method for adjusting the broadcast beam domain.

It should be understood that, in various embodiments of the present disclosure, sequence numbers of the foregoing processes do not indicate an execution sequence. The execution sequence of the processes should be determined based on functions and internal logic of the processes, and should not be construed as any limitation on the implementation processes of the embodiments of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof. In addition, the modifications or replacements do not make the essence of the corresponding technical solutions depart from the scope of the technical solutions of the embodiments of the present disclosure.

What is claimed is:

1. A method for adjusting a broadcast beam domain, comprising: obtaining user equipment distribution information of at least two beam domains, wherein each beam domain is a vertical area in a physically vertical dimension of a cell coverage area, and wherein the user equipment distribution information is a distribution situation of user equipments in a coverage area of each beam domain;
   determining information about a concentrated beam domain based on the user equipment distribution information, comprising:
      obtaining, based on the user equipment distribution information, each quantity of user equipments covered by each beam domain;
      if a respective quantity of user equipments exceeds a quantity threshold, determining a concentrated beam domain based on a preset ratio threshold and a ratio of the corresponding beam domain based on the respective quantity of user equipments covered by the respective beam domain to a total quantity of user equipments, wherein the quantity threshold is the preset ratio threshold multiplied by the total quantity of user equipments; and
      recording the information about the concentrated beam domain, wherein there is at least one concentrated beam domain; and
   compared with information about a historical concentrated beam domain, if the information about the concentrated beam domain satisfies a preset condition, adjusting a broadcast beam domain based on the information about the concentrated beam domain, so that a main lobe direction of the broadcast beam domain is adjusted to the concentrated beam domain.

2. The method according to claim 1, wherein before the obtaining user equipment distribution information of the beam domain, the method further comprises:
   obtaining direction angle information of the vertical area, wherein there are at least two vertical areas, and the vertical area is obtained through division in the physically vertical dimension of the cell coverage area;
   setting a cell uplink beam matrix based on the direction angle information; and
   determining the at least two beam domains based on the cell uplink beam matrix, wherein each beam domain of the at least two beam domains corresponds to a respective vertical area.

3. The method according to claim 2, wherein the obtaining user equipment distribution information of the beam domain comprises:
   obtaining channel sounding information of a user equipment, wherein there is at least one user equipment;
   performing weighted processing on the channel sounding information and the cell uplink beam matrix, to obtain a weighted result; and
   determining, based on the weighted result, a beam domain in which the user equipment is located, to obtain the user equipment distribution information of the beam domain.

4. The method according to claim 1, wherein before the adjusting the broadcast beam domain based on the information about the concentrated beam domain, the method further comprises:
   obtaining the information about the historical concentrated beam domain, wherein the historical concentrated beam domain is a beam domain corresponding to the broadcast beam domain used when last time a broadcast beam is transmitted;
   if the historical concentrated beam domain and the concentrated beam domain reach preset area isolation, determining that, compared with the information about the historical concentrated beam domain, the information about the concentrated beam domain satisfies the preset condition.

5. The method according to claim 4, wherein the adjusting the broadcast beam domain based on the information about the concentrated beam domain comprises:
   determining a broadcast beam weighted value of the concentrated beam domain based on the information about the concentrated beam domain;
   determining a historical broadcast beam weighted value of the historical concentrated beam domain based on the information about the historical concentrated beam domain; and
   adjusting the historical broadcast beam weighted value as the broadcast beam weighted value, so that the main lobe direction of the broadcast beam domain is adjusted to the concentrated beam domain.

6. An apparatus for adjusting a broadcast beam domain, comprising:
   a processor, and
   a memory coupled to the processor to store instructions, which when executed by the processor, cause the processor to perform operations, the operations comprising:
   obtaining user equipment distribution information of at least two beam domains, wherein each beam domain is a vertical area in a physically vertical dimension of a cell coverage area, and wherein the user equipment distribution information is a distribution situation of user equipments in a coverage area of each beam domain;
   determining information about a concentrated beam domain based on the user equipment distribution information, comprising:
      obtaining, based on the user equipment distribution information, each quantity of user equipments covered by each beam domain;
      if a respective quantity of user equipments exceeds a quantity threshold, determining a concentrated beam domain based on a preset ratio threshold and a ratio of the corresponding beam domain based on the respective quantity of user equipments covered by the respective beam domain to a total quantity of user equipments, wherein the quantity threshold is the preset ratio threshold multiplied by the total quantity of user equipments; and recording the information about the concentrated beam domain, wherein there is at least one concentrated beam domain, and compared with information about a historical concentrated beam domain, when the information about the concentrated beam domain satisfies a preset condition, adjusting a broadcast beam domain based on the information about the concentrated beam domain, so that a main lobe direction of the broadcast beam domain is adjusted to the concentrated beam domain.

7. The apparatus according to claim 6, the operations further comprising:

obtaining direction angle information of the vertical area, wherein there are at least two vertical areas, and the vertical area is obtained through division in the physically vertical dimension of the cell coverage area;

setting a cell uplink beam matrix based on the direction angle information; and determining the at least two beam domains based on the cell uplink beam matrix, wherein each beam domain corresponds to one vertical area.

8. The apparatus according to claim 7, the operations further comprising:

obtaining channel sounding information of a user equipment, wherein there is at least one user equipment;

performing weighted processing on the channel sounding information and the cell uplink beam matrix, to obtain a weighted result; and determining, based on the weighted result, a beam domain in which the user equipment is located, to obtain the user equipment distribution information of the beam domain.

9. The apparatus according to claim 6, the operations further comprising:

obtaining the information about the historical concentrated beam domain, wherein the historical concentrated beam domain is a beam domain corresponding to the broadcast beam domain used when last time a broadcast beam is transmitted; and when the historical concentrated beam domain and the concentrated beam domain reach preset area isolation, determining that, compared with the information about the historical concentrated beam domain, the information about the concentrated beam domain satisfies the preset condition.

10. The apparatus according to claim 9, the operations further comprising:

determining a broadcast beam weighted value of the concentrated beam domain based on the information about the concentrated beam domain;

determining a historical broadcast beam weighted value of the historical concentrated beam domain based on the information about the historical concentrated beam domain; and adjusting the historical broadcast beam weighted value as the broadcast beam weighted value, so that the main lobe direction of the broadcast beam domain is adjusted to the concentrated beam domain.

11. A device, comprising:

a transceiver configured to obtain user equipment distribution information of at least two beam domains, wherein each beam domain is a vertical area in a physically vertical dimension of a cell coverage area, and wherein the user equipment distribution information is a distribution situation of user equipments in a coverage area of each beam domain; and a processor is configured to determine information about a concentrated beam domain based on the user equipment distribution information, comprising:

obtaining, based on the user equipment distribution information, each quantity of user equipments covered by each beam domain;

if a respective quantity of user equipments exceeds a quantity threshold, determining a concentrated beam domain based on a preset ratio threshold and a ratio of the corresponding beam domain based on the respective quantity of user equipments covered by the respective beam domain to a total quantity of user equipments, wherein the quantity threshold is the preset ratio threshold multiplied by the total quantity of user equipments; and recording the information about the concentrated beam domain, wherein there is at least one concentrated beam domain, and compared with information about a historical concentrated beam domain, when the information about the concentrated beam domain satisfies a preset condition, adjust a broadcast beam domain based on the information about the concentrated beam domain, so that a main lobe direction of the broadcast beam domain is adjusted to the concentrated beam domain.

12. The device according to claim 11, wherein the transceiver is further configured to obtain direction angle information of the vertical area, wherein there are at least two vertical areas, and the vertical area is obtained through division in the physically vertical dimension of the cell coverage area;

the processor further configured to set a cell uplink beam matrix based on the direction angle information, and determine the at least two beam domains based on the cell uplink beam matrix, wherein each beam domain corresponds to one vertical area.

13. The device according to claim 12, wherein the transceiver is further configured to obtain channel sounding information of a user equipment, wherein there is at least one user equipment;

the processor is further configured to perform weighted processing on the channel sounding information and the cell uplink beam matrix, to obtain a weighted result, and determine, based on the weighted result, a beam domain in which the user equipment is located, to obtain the user equipment distribution information of the beam domain.

14. The device according to claim 11, wherein the transceiver is further configured to obtain the information about the historical concentrated beam domain, wherein the historical concentrated beam domain is a beam domain corresponding to the broadcast beam domain used when last time a broadcast beam is transmitted; and the processor is further configured to: when the historical concentrated beam domain and the concentrated beam domain reach preset area isolation, determine that, compared with the information about the historical concentrated beam domain, the information about the concentrated beam domain satisfies the preset condition.

15. The device according to claim 14, wherein the processor is further configured to determine a broadcast beam weighted value of the concentrated beam domain based on the information about the concentrated beam domain;

determine a historical broadcast beam weighted value of the historical concentrated beam domain based on the information about the historical concentrated beam domain; and adjust the historical broadcast beam weighted value as the broadcast beam weighted value, so that the main lobe direction of the broadcast beam domain is adjusted to the concentrated beam domain.

* * * * *